United States Patent
Blankespoor

(10) Patent No.: US 9,969,087 B1
(45) Date of Patent: May 15, 2018

(54) LEG COLLISION AVOIDANCE IN A ROBOTIC DEVICE

(71) Applicant: Google Inc., Mountain View, CA (US)

(72) Inventor: Kevin Blankespoor, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days. days.

(21) Appl. No.: 15/232,439

(22) Filed: Aug. 9, 2016

Related U.S. Application Data

(63) Continuation of application No. 14/538,777, filed on Nov. 11, 2014, now Pat. No. 9,446,518.

(51) Int. Cl.
*G05B 19/04* (2006.01)
*B25J 9/16* (2006.01)

(52) U.S. Cl.
CPC ............ *B25J 9/1666* (2013.01); *Y10S 901/01* (2013.01)

(58) Field of Classification Search
CPC .... Y10S 901/01; Y10S 901/02; Y10S 901/28; A61B 5/112; A61B 5/10; A61B 5/4851; A61B 5/4023; G05D 2201/0217; G06N 3/008; A61F 5/01; A61H 3/00; B25J 9/1676; B25J 9/1648; G05B 2219/40476; G05B 2219/40477; G05B 2219/39096; G05B 2219/23289; B62C 57/032; B62D 57/02; B62D 57/00; B62D 57/032
See application file for complete search history.

(56) References Cited

U.S. PATENT DOCUMENTS

| | | | | |
|---|---|---|---|---|
| 4,834,200 A | * | 5/1989 | Kajita | ............... B62D 57/02 180/8.1 |
| 5,151,859 A | | 9/1992 | Yoshino et al. | |

(Continued)

FOREIGN PATENT DOCUMENTS

| JP | 2008183701 A | * | 8/2008 |
|---|---|---|---|
| KR | 100815247 | | 3/2008 |

OTHER PUBLICATIONS

Abe et al., "Multiobjective Control with Frictional Contacts," Eurographics/ACM SIGGRAPH Symposium on Computer Animation, Aug. 4-5, 2007, San Diego, California, 10 pages.

(Continued)

*Primary Examiner* — Khoi H Tran
*Assistant Examiner* — Jorge O Peche
(74) *Attorney, Agent, or Firm* — Honigman Miller Schwartz and Cohn LLP

(57) ABSTRACT

An example implementation for avoiding leg collisions may involve a biped robot reducing a three-dimensional system to a two-dimensional projection of the biped robot's feet. An example biped robot may determine a touchdown location for a swing foot. The biped robot may determine lateral positions of the touchdown location and the swing foot, each relative to a stance foot. Based on one or more of the determined lateral positions of the touchdown location and the swing foot, each relative to the stance foot, the biped robot may determine an intermediate swing point for the swing foot that is not on a line defined by the swing foot and the touchdown location. The biped robot may further cause the swing foot to move to the intermediate swing point, and then cause the swing foot to move to the touchdown location.

18 Claims, 10 Drawing Sheets

(56) References Cited

U.S. PATENT DOCUMENTS

| | | | | |
|---|---|---|---|---|
| 5,355,064 A * | 10/1994 | Yoshino | ............... | B62D 57/032 180/8.1 |
| 5,416,393 A * | 5/1995 | Gomi | ............... | B62D 57/032 180/8.1 |
| 5,432,417 A | 7/1995 | Takenaka et al. | | |
| 5,459,659 A * | 10/1995 | Takenaka | ............... | B62D 57/032 180/8.1 |
| 5,644,204 A | 7/1997 | Nagle | | |
| 5,737,217 A | 4/1998 | Nishikawa et al. | | |
| 5,808,433 A * | 9/1998 | Tagami | ............... | B62D 57/032 180/8.6 |
| 5,838,130 A | 11/1998 | Ozawa | | |
| 5,974,366 A * | 10/1999 | Kawai | ............... | B62D 57/032 318/568.12 |
| 6,064,167 A * | 5/2000 | Takenaka | ............... | B25J 19/005 318/568.12 |
| 6,177,776 B1 * | 1/2001 | Kawai | ............... | B25J 13/085 180/8.1 |
| 6,374,157 B1 * | 4/2002 | Takamura | ............... | B25J 9/1674 318/568.12 |
| 6,484,068 B1 * | 11/2002 | Yamamoto | ............... | B25J 19/0016 198/380 |
| 6,493,607 B1 * | 12/2002 | Bourne | ............... | B25J 9/1666 414/744.3 |
| 6,802,382 B2 | 10/2004 | Hattori et al. | | |
| 6,943,520 B2 * | 9/2005 | Furuta | ............... | B62D 57/032 318/568.12 |
| 6,992,455 B2 * | 1/2006 | Kato | ............... | B25J 19/0091 318/568.1 |
| 6,992,457 B2 | 1/2006 | Furuta et al. | | |
| 6,999,851 B2 | 2/2006 | Kato et al. | | |
| 7,013,201 B2 * | 3/2006 | Hattori | ............... | B62D 57/032 180/8.1 |
| 7,076,331 B1 * | 7/2006 | Nagatsuka | ............... | A63H 11/00 318/568.12 |
| 7,120,518 B2 | 10/2006 | Takenaka et al. | | |
| 7,236,852 B2 | 6/2007 | Moridaira et al. | | |
| 7,386,364 B2 | 6/2008 | Mikami et al. | | |
| 7,603,234 B2 | 10/2009 | Takenaka et al. | | |
| 7,606,634 B2 | 10/2009 | Takenaka et al. | | |
| 7,657,345 B2 * | 2/2010 | Endo | ............... | B25J 9/161 318/568.17 |
| 7,734,377 B2 | 6/2010 | Hasegawa | | |
| 7,734,378 B2 * | 6/2010 | Takenaka | ............... | B62D 57/032 318/568.12 |
| 7,881,824 B2 | 2/2011 | Nagasaka et al. | | |
| 7,949,430 B2 * | 5/2011 | Pratt | ............... | B62D 57/032 180/8.5 |
| 8,060,253 B2 | 11/2011 | Goswami et al. | | |
| 8,108,070 B2 | 1/2012 | Tajima | | |
| 8,172,013 B2 | 5/2012 | Shimada | | |
| 8,195,332 B2 * | 6/2012 | Pratt | ............... | B62D 57/032 318/568.12 |
| 8,239,084 B2 * | 8/2012 | Yamamoto | ............... | G05D 1/024 701/1 |
| 8,306,657 B2 * | 11/2012 | Yoshiike | ............... | G06N 3/008 700/245 |
| 8,311,731 B2 * | 11/2012 | Sugiura | ............... | B25J 9/1666 345/473 |
| 8,332,068 B2 | 12/2012 | Goswami et al. | | |
| 8,386,076 B2 * | 2/2013 | Honda | ............... | B62D 57/032 180/8.5 |
| 8,396,593 B2 | 3/2013 | Orita | | |
| 8,457,830 B2 | 6/2013 | Goulding | | |
| 8,532,824 B2 * | 9/2013 | Orita | ............... | B62D 57/032 700/245 |
| 8,565,921 B2 * | 10/2013 | Doi | ............... | B62D 57/032 318/568.1 |
| 8,583,283 B2 * | 11/2013 | Takenaka | ............... | B25J 19/0091 700/245 |
| 8,630,763 B2 * | 1/2014 | Goulding | ............... | B62D 57/024 318/568.11 |
| 8,688,307 B2 * | 4/2014 | Sekiya | ............... | B25J 9/162 701/26 |
| 8,738,178 B2 * | 5/2014 | Choi | ............... | B62D 57/032 180/8.1 |
| 8,825,391 B1 * | 9/2014 | Urmson | ............... | G01C 21/32 701/1 |
| 8,849,454 B2 * | 9/2014 | Yun | ............... | B62D 57/032 700/253 |
| 8,855,820 B2 * | 10/2014 | Watabe | ............... | G05D 3/12 700/253 |
| 8,855,821 B2 | 10/2014 | Seo et al. | | |
| 8,924,021 B2 * | 12/2014 | Dariush | ............... | G06N 3/008 700/245 |
| 8,948,956 B2 * | 2/2015 | Takahashi | ............... | B25J 5/007 701/27 |
| 8,965,573 B2 * | 2/2015 | Maisonnier | ............... | B62D 57/032 318/568.12 |
| 9,044,862 B2 * | 6/2015 | Kim | ............... | B25J 9/1666 |
| 9,102,055 B1 * | 8/2015 | Konolige | ............... | B25J 9/163 |
| 9,207,678 B2 * | 12/2015 | Kim | ............... | G05D 1/0246 |
| 9,266,233 B2 * | 2/2016 | Kornbluh | ............... | B25J 9/0006 |
| 9,317,743 B2 * | 4/2016 | Datta | ............... | G06K 9/00362 |
| 9,352,470 B1 * | 5/2016 | da Silva | ............... | B25J 13/088 |
| 2002/0183897 A1 * | 12/2002 | Kuroki | ............... | B62D 57/032 700/245 |
| 2003/0009259 A1 * | 1/2003 | Hattori | ............... | B25J 13/085 700/245 |
| 2003/0154201 A1 * | 8/2003 | Berestov | ............... | G06T 17/05 |
| 2004/0044440 A1 * | 3/2004 | Takenaka | ............... | B62D 57/032 700/245 |
| 2004/0099450 A1 * | 5/2004 | Kwok | ............... | A63G 19/18 180/8.6 |
| 2004/0167641 A1 * | 8/2004 | Kawai | ............... | A61L 35/1038 700/63 |
| 2004/0172165 A1 * | 9/2004 | Iribe | ............... | B62D 57/032 700/245 |
| 2004/0193323 A1 * | 9/2004 | Higaki | ............... | G06K 9/00348 700/259 |
| 2004/0205417 A1 | 10/2004 | Moridaira et al. | | |
| 2004/0230340 A1 * | 11/2004 | Fukuchi | ............... | G05D 1/0088 700/245 |
| 2004/0236467 A1 * | 11/2004 | Sano | ............... | B25J 13/02 700/245 |
| 2005/0021176 A1 * | 1/2005 | Takenaka | ............... | B62D 57/02 700/245 |
| 2005/0067993 A1 * | 3/2005 | Kato | ............... | B25J 19/0091 318/568.12 |
| 2005/0075755 A1 * | 4/2005 | Takenaka | ............... | B62D 57/032 700/245 |
| 2005/0077856 A1 | 4/2005 | Takenaka et al. | | |
| 2005/0110448 A1 * | 5/2005 | Takenaka | ............... | B62D 57/02 318/568.12 |
| 2005/0113973 A1 * | 5/2005 | Endo | ............... | B25J 9/161 700/245 |
| 2005/0120820 A1 | 6/2005 | Takenaka et al. | | |
| 2005/0216097 A1 * | 9/2005 | Rifkin | ............... | A61F 2/60 623/53 |
| 2005/0228539 A1 * | 10/2005 | Takenaka | ............... | B25J 13/085 700/245 |
| 2005/0240307 A1 * | 10/2005 | Kuroki | ............... | B25J 13/085 700/245 |
| 2006/0064203 A1 * | 3/2006 | Goto | ............... | G05D 1/0246 700/245 |
| 2006/0076167 A1 * | 4/2006 | Setrakian | ............... | B62D 57/00 180/8.1 |
| 2006/0173578 A1 * | 8/2006 | Takenaka | ............... | B62D 57/032 700/245 |
| 2006/0247800 A1 * | 11/2006 | Takenaka | ............... | B62D 57/032 700/54 |
| 2007/0003915 A1 * | 1/2007 | Templeman | ............... | G06F 3/011 434/247 |
| 2007/0126387 A1 | 6/2007 | Takenaka et al. | | |
| 2007/0150095 A1 * | 6/2007 | Zaier | ............... | G06N 3/008 700/245 |
| 2007/0152620 A1 | 7/2007 | Takenaka et al. | | |

(56) References Cited

U.S. PATENT DOCUMENTS

| | | | |
|---|---|---|---|
| 2007/0156283 A1* | 7/2007 | Takenaka | B25J 9/1664 700/245 |
| 2007/0193789 A1 | 8/2007 | Takenaka et al. | |
| 2007/0220637 A1* | 9/2007 | Endo | B25J 9/161 318/568.17 |
| 2007/0227786 A1* | 10/2007 | Hillis | B62D 57/022 180/8.1 |
| 2007/0241713 A1 | 10/2007 | Yamamoto et al. | |
| 2008/0065269 A1 | 3/2008 | Hasegawa | |
| 2008/0133055 A1 | 6/2008 | Hasegawa | |
| 2008/0160873 A1* | 7/2008 | Yoneda | A63H 11/18 446/86 |
| 2008/0208391 A1 | 8/2008 | Hasegawa et al. | |
| 2009/0005906 A1 | 1/2009 | Tajima | |
| 2009/0030530 A1* | 1/2009 | Martin | A61F 2/6607 623/53 |
| 2009/0171503 A1* | 7/2009 | Takenaka | B62D 57/032 700/250 |
| 2009/0306821 A1* | 12/2009 | Park | B62D 57/032 700/245 |
| 2009/0312867 A1 | 12/2009 | Hasegawa et al. | |
| 2009/0325699 A1 | 12/2009 | Delgiannidis | |
| 2010/0017028 A1 | 1/2010 | Suga et al. | |
| 2010/0057253 A1* | 3/2010 | Kwon | B25J 19/0091 700/245 |
| 2010/0113980 A1 | 5/2010 | Herr et al. | |
| 2010/0126785 A1 | 5/2010 | Shimada | |
| 2010/0161120 A1 | 6/2010 | Goswami et al. | |
| 2010/0161126 A1 | 6/2010 | Goswami et al. | |
| 2010/0174409 A1 | 7/2010 | Park et al. | |
| 2010/0252395 A1* | 10/2010 | Lehtonen | B02C 21/026 198/300 |
| 2010/0277483 A1 | 11/2010 | Lee et al. | |
| 2010/0292838 A1* | 11/2010 | Goswami | B25J 9/163 700/246 |
| 2011/0009241 A1* | 1/2011 | Lane | A63B 24/0087 482/8 |
| 2011/0022232 A1 | 1/2011 | Yoshiike et al. | |
| 2011/0098857 A1* | 4/2011 | Yoshiike | B62D 57/032 700/246 |
| 2011/0098860 A1* | 4/2011 | Yoshiike | B62D 57/032 700/260 |
| 2011/0172825 A1* | 7/2011 | Lee | B25J 9/161 700/261 |
| 2011/0178637 A1* | 7/2011 | Lee | B25J 9/1648 700/254 |
| 2011/0224827 A1* | 9/2011 | Andoh | B62D 57/032 700/258 |
| 2011/0231050 A1* | 9/2011 | Goulding | B62D 57/024 701/26 |
| 2011/0257764 A1 | 10/2011 | Herr et al. | |
| 2011/0264264 A1 | 10/2011 | Shirokura et al. | |
| 2011/0301756 A1* | 12/2011 | Yoshiike | B62D 57/032 700/253 |
| 2012/0072026 A1 | 3/2012 | Takagi | |
| 2012/0158175 A1 | 6/2012 | Lee et al. | |
| 2012/0203359 A1 | 8/2012 | Schimmels et al. | |
| 2012/0245734 A1* | 9/2012 | Yun | B62D 57/032 700/253 |
| 2012/0259463 A1* | 10/2012 | Orita | B25J 9/1648 700/245 |
| 2012/0277907 A1* | 11/2012 | Kim | B25J 9/1664 700/245 |
| 2012/0310412 A1* | 12/2012 | Seo | B25J 9/0006 700/254 |
| 2012/0316682 A1* | 12/2012 | Seo | B62D 57/032 700/261 |
| 2012/0316683 A1* | 12/2012 | Seo | B62D 57/032 700/261 |
| 2012/0316684 A1 | 12/2012 | Lee et al. | |
| 2013/0079929 A1* | 3/2013 | Lim | B62D 57/032 700/250 |
| 2013/0144439 A1* | 6/2013 | Lee | B25J 9/1633 700/261 |
| 2013/0178983 A1 | 7/2013 | Watabe | |
| 2013/0184861 A1* | 7/2013 | Pratt | G05D 1/021 700/245 |
| 2013/0206488 A1* | 8/2013 | Horinouchi | A63H 11/20 180/8.6 |
| 2013/0238122 A1 | 9/2013 | Hodgins et al. | |
| 2013/0238183 A1 | 9/2013 | Goulding | |
| 2014/0019082 A1* | 1/2014 | Lan | G01C 21/206 702/141 |
| 2015/0051734 A1* | 2/2015 | Zheng | B25J 9/1633 700/261 |
| 2015/0073592 A1* | 3/2015 | Kaneko | B62D 57/024 700/245 |
| 2015/0120044 A1* | 4/2015 | Cory | B62D 57/032 700/250 |
| 2015/0134080 A1* | 5/2015 | Roh | B25J 9/0006 623/32 |
| 2015/0202768 A1* | 7/2015 | Moridaira | B62D 57/032 700/258 |

OTHER PUBLICATIONS

Bajracharya, et al., "High fidelity day/night stereo mapping with vegetation and negative obstacle detection for vision-in-the-loop walking," 2013 IEEE/RSJ International Conference on Intelligent Robots and Systems (IROS), Nov. 2013, pp. 3663-3670, IEEE, Tokyo, Japan.

Doshi et al., "Collision Detection in Legged Locomotion using Supervised Learning", 2007, 6 pages, MIT Cambridge, US.

Hashlamon et al., "Simple Virtual Slip Force Sensor for Walking Biped Robots," IEEE, 2013, pp. 1-5.

Kim et al., "Landing Force Controller for a Humanoid Robot: Time-Domain Passivity Approach," 2006 IEEE Conference on Systems, Man, and Cybernetics, Oct. 8-11, 2006, Taipei, Taiwan, pp. 4237-4242.

Koolen et al., "Capturability-Based Analysis and Control of Legged Locomotion, Part 1: Theory and Application to Three Simple Gait Models," The International Journal of Robotics Research, 2012, pp. 1094-1113, vol. 31, No. 9.

Pratt et al., "Capture Point: A Step Toward Humanoid Push Recovery," IEEE Humanoid Robots, 2006 6th IEEE-RAS International Conference, Symposium, Dec. 2-6, 2006, pp. 1-8, Genova, Italy.

Pratt et al., "Capturability-Based Analysis and Control of Legged Locomotion, Part 2: Application to M2V2, a Lower Body Humanoid," The International Journal of Robotics Research, Apr. 2011, pp. 1-25.

Silva et al., "Goal-Oriented Biped Walking Based on Force Interaction Control," Proceedings of the 2001 IEEE International Conference on Robotics & Automation, Seoul, Korea, May 21-26, 2001, pp. 4122-3127.

Silva et al., "Towards Force Interaction Control of Biped Walking Robots," Proceedings of 2004 IEEE/RSJ International Conference on Intelligent Robots and Systems, Sendai, Japan, Sep. 28-Oct. 2, 2004, pp. 2568-2573.

Non-Final Office Action dated Apr. 29, 2016, issued in connection with U.S. Appl. No. 14/709,830, filed May 12, 2015, 39 pages.

Non-Final Office Action dated Apr. 15, 2016, issued in connection with U.S. Appl. No. 14/585,542, filed Dec. 30, 2014, 12 pages.

Non-Final Office Action dated Jun. 3, 2016, issued in connection with U.S. Appl. No. 14/538,777, filed Nov. 11, 2014, 16 pages.

Non-Final Office Action dated Aug. 19, 2015, issued in connection with U.S. Appl. No. 14/468,118, filed Aug. 25, 2014, 14 pages.

Notice of Allowance dated Mar. 14, 2016, issued in connection with U.S. Appl. No. 14/468,118, filed Aug. 25, 2014, 10 pages.

Non-Final Office Action dated Sep. 2, 2015, issued in connection with U.S. Appl. No. 14/468,031, filed Aug. 25, 2014, 31 pages.

Non-Final Office Action dated Mar. 23, 2016, issued in connection with U.S. Appl. No. 14/468,146, filed Aug. 25, 2014, 31 pages.

Notice of Allowance dated Mar. 2, 2016, issued in connection with U.S. Appl. No. 14/468,031, filed Aug. 25, 2014, 7 pages.

(56) References Cited

OTHER PUBLICATIONS

Notice of Allowance dated Jun. 24, 2016, issued in connection with U.S. Appl. No. 14/538,777, filed Nov. 11, 2014, 20 pages.
Notice of Allowance dated Jul. 21, 2016, issued in connection with U.S. Appl. No. 14/585,542, filed Dec. 30, 2014, 5 pages.

* cited by examiner

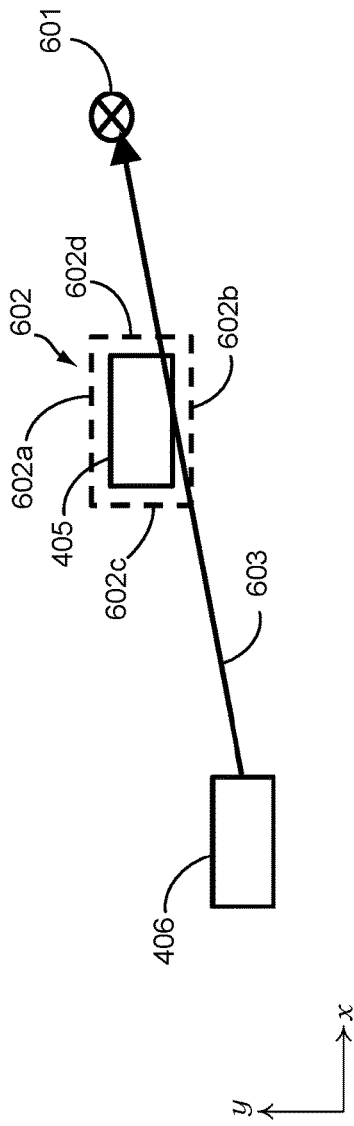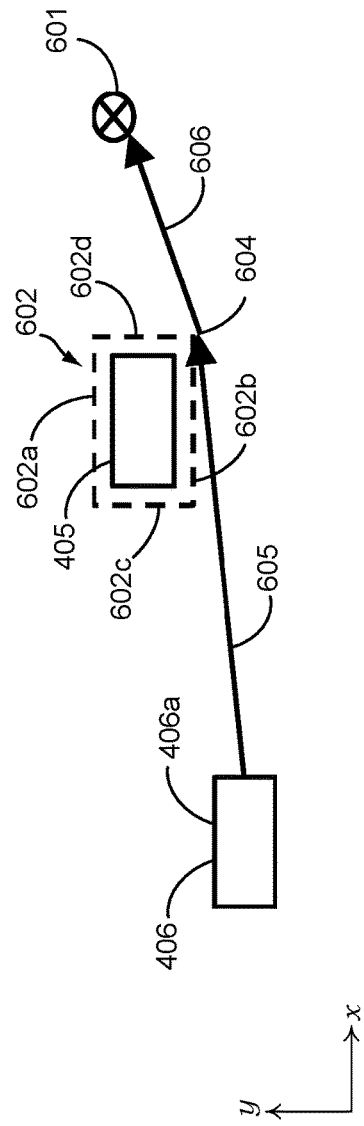

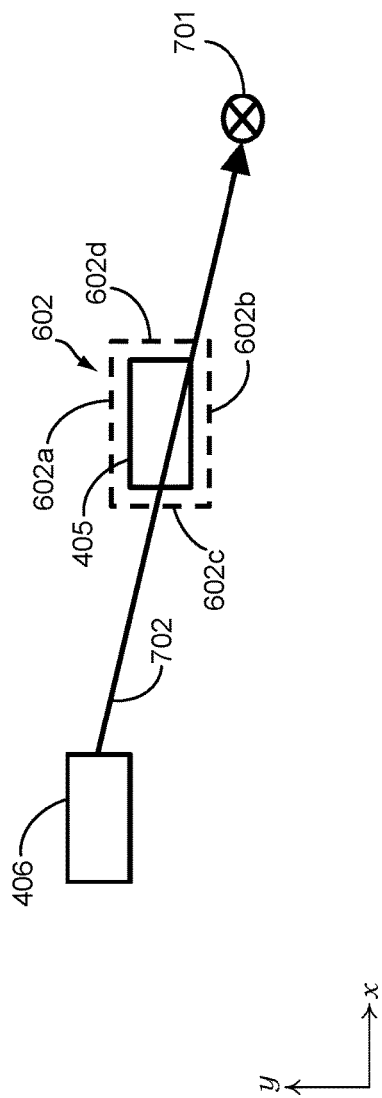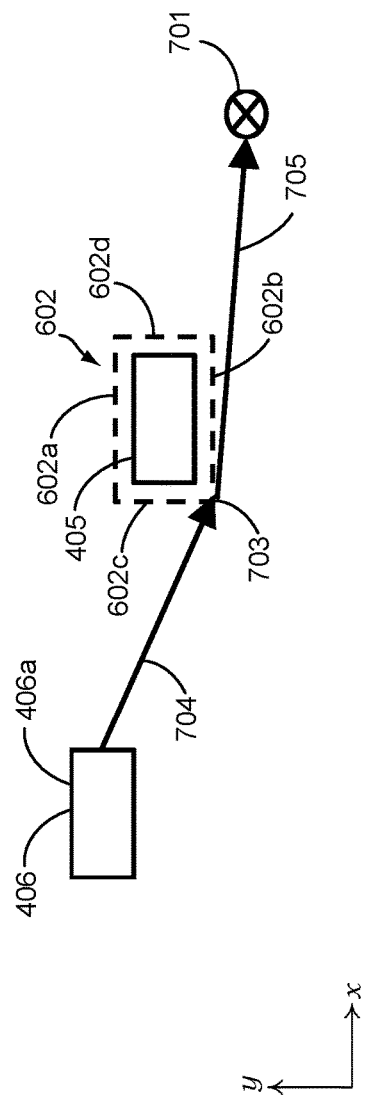

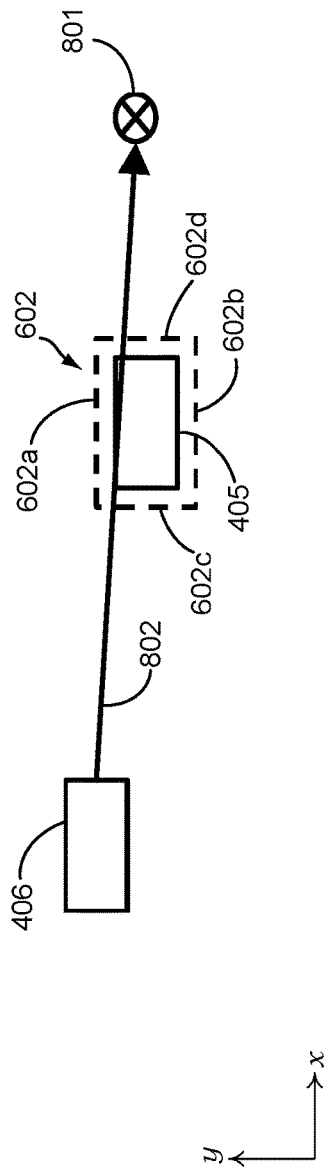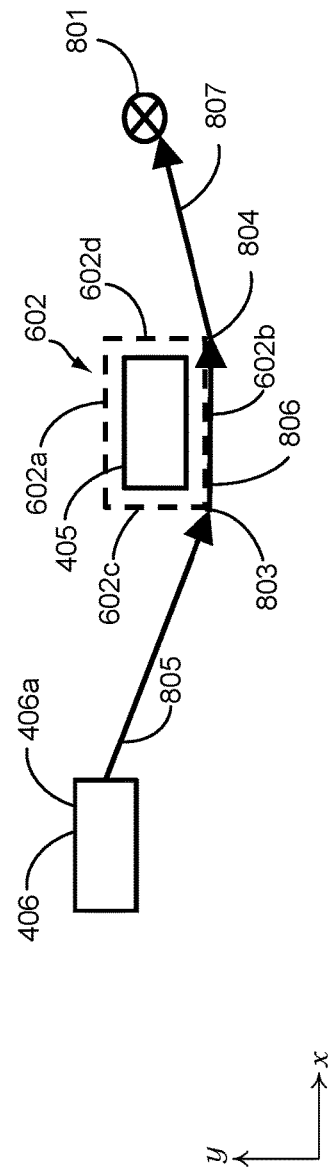

US 9,969,087 B1

LEG COLLISION AVOIDANCE IN A ROBOTIC DEVICE

CROSS-REFERENCE TO RELATED APPLICATION

This application is a continuation of and claims priority to U.S. patent application Ser. No. 14/538,777, filed Nov. 11, 2014, which is hereby incorporated by reference in its entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY

The present disclosure generally relates to controlling a legged robot. Specifically, implementations described herein may allow for efficient operation of a legged robot that may determine and avoid a potential leg collision between a swing leg and a stance leg. These as well as other aspects, advantages, and alternatives will become apparent to those of ordinary skill in the art by reading the following detailed description, with reference where appropriate to the accompanying drawings.

A first example implementation may include (i) determining a touchdown location for a swing foot of a biped robot, the biped robot having a stance foot, where the swing foot and stance foot are each coupled to a body of the biped robot, (ii) determining a lateral position of the touchdown location relative to the stance foot, (iii) determining a lateral position of the swing foot relative to the stance foot, (iv) based on one or more of the determined lateral positions of the touchdown location and the swing foot, each relative to the stance foot, determining an intermediate swing point for the swing foot, where the intermediate swing point is not on a line defined by the swing foot and the touchdown location, (v) causing, by the biped robot, the swing foot to move to the intermediate swing point, and (vi) after causing the swing foot to move to the intermediate swing point, causing the swing foot to move to the touchdown location.

A second example implementation may include (i) determining a touchdown location for a swing foot of a biped robot, the biped robot having a stance foot, where the swing foot and stance foot are each coupled to a body of the biped robot, (ii) determining a forward velocity of the biped robot, (iii) determining a lateral position of the touchdown location relative to the stance foot, (v) based on the determined forward velocity of the biped robot and the determined lateral position of the touchdown location relative to the stance foot, updating the touchdown location, and (vi) causing, by the biped robot the swing foot to move to the updated touchdown location.

A third example implementation may include a system having means for performing operations in accordance with the first example implementation.

A fourth example implementation may include a system having means for performing operations in accordance with the second example implementation.

A fifth example implementation may include a biped robot having (i) a body, (ii) a swing foot coupled to the body, (iii) a stance foot coupled to the body, (iv) a processor; (v) a non-transitory computer readable medium; and (vi) program instructions stored on the non-transitory computer readable medium that, when executed by the processor, cause the biped robot to perform operations in accordance with the first example implementation.

A sixth example implementation may include a biped robot having (i) a body, (ii) a swing foot coupled to the body, (iii) a stance foot coupled to the body, (iv) a processor; (v) a non-transitory computer readable medium; and (vi) program instructions stored on the non-transitory computer readable medium that, when executed by the processor, cause the biped robot to perform operations in accordance with the second example implementation.

BRIEF DESCRIPTION OF THE DRAWINGS

FIG. 6A illustrates a swing foot and a stance foot of a robot, according to an example implementation.

FIG. 6B illustrates the swing foot and the stance foot of the robot, according to the example implementation shown in FIG. 6A.

FIG. 7A illustrates the swing foot and the stance foot of the robot, according to another example implementation.

FIG. 7B illustrates the swing foot and the stance foot of the robot, according to the example implementation shown in FIG. 7A.

FIG. 8A illustrates the swing foot and the stance foot of the robot, according to yet another example implementation.

FIG. 8B illustrates the swing foot and the stance foot of the robot, according to the example implementation shown in FIG. 8A.

DETAILED DESCRIPTION

Figure 1:
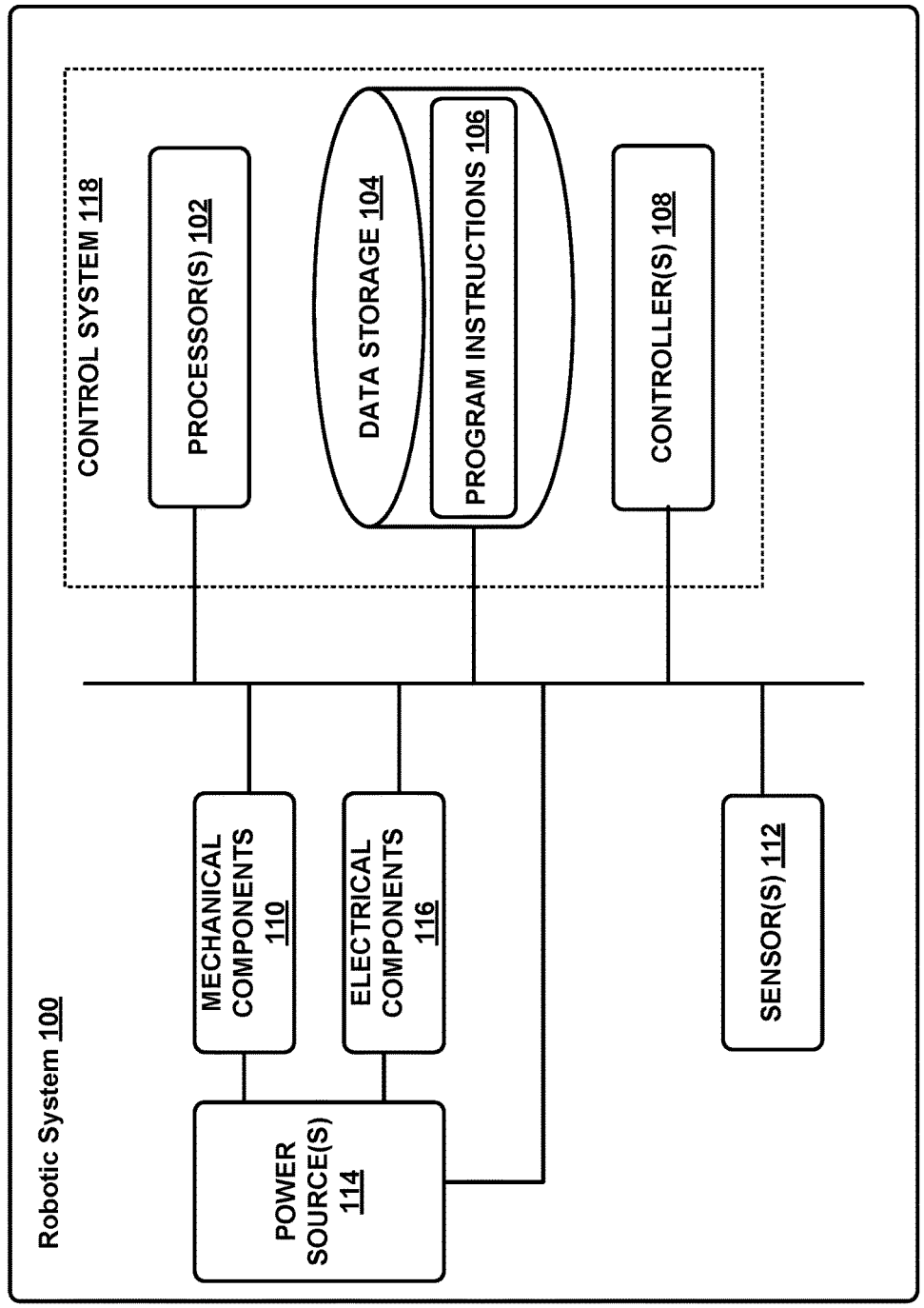
FIG. 1 illustrates a configuration of a robotic system, according to an example implementation.

Example implementations are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. OVERVIEW

Example implementations relate to the determination and avoidance of potential leg collisions of a robot. The determination of potential leg collisions may involve determining forward and lateral positions of a swing foot and a touchdown location for the swing foot, both in relation to a stance foot. Avoiding a potential leg collision may involve adjusting a swing path of the swing foot, and/or updating the touchdown location.

In some previous systems, an example robot may determine potential collisions of its legs by monitoring, via received sensor data, the movement and position of each of the links and joints in both of its legs. This may allow the robot to determine potential collisions between each of these components. For instance, the robot may monitor the trajectory of the robot's right knee in relation to the robot's left thigh, left knee, left shin, and left foot, and may do the same for the robot's right thigh, right shin, right foot, and so forth. This may result in a relatively large computational demand on the processor(s) of the robot.

Further, if a potential collision is determined between one or more of the links and/or joints, determining corrective measures to avoid the potential collision may also require a relatively large amount of processor capacity and time. For example, altering the trajectory of a swing leg to avoid one joint-joint or joint-link collision might not ensure that all determined collisions have been avoided. Thus, the robot may need to determine multiple possible corrections simultaneously. Nonetheless, this approach may be desirable in some applications, where relatively large gait disturbances, such as adductions or abductions of the legs, may be possible.

In some implementations discussed below, the determination of potential leg collisions may be simplified based on the morphology of the robot. For instance, in some cases, the joints of the robot's swing leg may maintain a relatively constant relationship during most gaits, such that the hip, knee, and foot remain in approximately the same plane, which may be referred to as a swing plane. Similarly, the hip, knee, and foot of the stance leg may remain in approximately the same stance plane. Although these planes may rotate about the respective hips of the robot as the feet move laterally, the hips of the robot remain a fixed distance from each other. Therefore, as the feet approach a collision, the distance between the two planes increases in the direction of the robot's hips.

Based on these known geometric constraints, a determination that the feet of the robot will not collide in two dimensions (forward and lateral) implies that no part of the robot's legs above the feet will collide in three dimensions (forward, lateral, and vertical). Thus, the robot may simplify its determination of potential leg collisions by determining only the relative forward and lateral positions of its feet. This simplified approach to determining potential leg collisions may be less complex, and therefore require less computation and a lower processor demand, while retaining the same operation and achieving the same outcome.

Although a biped robot will be discussed below, other robot configurations are possible. For instance, the same analysis may apply to a given stance leg and a given swing leg on a quadruped robot, among other possibilities.

In some examples, the biped robot in a walking gait may include a stance foot (e.g., the left foot) and a swing foot (e.g., the right foot) for a given step. The biped robot may determine a desired touchdown location for the swing foot, and may further determine the lateral positions of the determined touchdown location and the swing foot, each relative to the stance foot. If the biped robot determines that one or both of (i) the position of the determined touchdown location or (ii) the position of the swing foot is laterally outside of (e.g., to the left of) the stance foot, a leg collision may potentially occur.

Additionally, the biped robot may monitor the forward position of the swing foot relative to the stance foot, which may allow the biped robot to further simplify the leg collision monitoring. For example, when the biped robot determines that the swing foot has moved forward past the front of the stance foot, the biped robot may discontinue the lateral collision monitoring described above, as a leg collision is no longer likely. This may further reduce the computation and processor demand for leg collision monitoring while retaining the same operation and achieving the same outcome.

When a potential leg collision is determined, the robot may also determine a gait correction to avoid the collision by considering only the forward and lateral positions of the feet. For example, the biped robot may determine an intermediate swing point for the swing foot. The intermediate swing point may be approximately located at one of the medial corners of the stance foot. The biped robot may then cause the swing foot to move to the intermediate swing point. After reaching the intermediate swing point, the swing foot may be clear of the stance foot, and thus the biped robot may cause the swing foot to move to the originally determined touchdown location. Thus, the biped robot may accomplish both operations of determining a potential leg collision and avoiding the leg collision by reducing a three-dimensional system to a two-dimensional analysis.

In some cases, the biped robot may determine an expanded footprint for one or both of the feet to further avoid leg collisions. For example, the stance foot may have a given footprint based on the structure of the foot. The biped robot may determine an expanded footprint that is larger than the structural footprint of the foot, and then determine the relative lateral positions of the swing foot, stance foot, and touchdown location, as well as the intermediate swing point(s), based on the expanded footprint.

II. EXAMPLE ROBOTIC SYSTEMS

Referring now to the figures, FIG. 1 illustrates an example configuration of a robotic system. The robotic system 100 represents an example robotic system configured to perform the implementations described herein. Additionally, the robotic system 100 may be configured to operate autonomously, semi-autonomously, and/or using directions provided by user(s), and may exist in various forms, such as a biped robot or a quadruped robot, among other examples. Furthermore, the robotic system 100 may also be referred to as a robotic device, mobile robot, or robot, among others.

As shown in FIG. 1, the robotic system 100 may include processor(s) 102, data storage 104, program instructions 106, and controller(s) 108, which together may be part of a control system 118. The robotic system 100 may also include sensor(s) 112, power source(s) 114, mechanical components 110, and electrical components 116. Note that the robotic system 100 is shown for illustration purposes as robotic system 100 and may include more or less components within various examples. The components of robotic system 100 may be connected in any manner, including wired or wireless connections, etc. Further, in some examples, components of the robotic system 100 may be positioned on multiple entities rather than a single entity. Other example illustrations of robotic system 100 may exist.

Processor(s) 102 may operate as one or more general-purpose processors or special purpose processors (e.g., digital signal processors, application specific integrated circuits, etc.). The processor(s) 102 may be configured to execute computer-readable program instructions 106 that are stored in the data storage 104 and are executable to provide the operations of the robotic system 100 described herein. For instance, the program instructions 106 may be executable to provide functionality of controller(s) 108, where the controller(s) 108 may be configured to cause activation and deactivation of the mechanical components 110 and the electrical components 116.

The data storage 104 may exist as various types of storage configured to hold memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic system 100 may include at least one controller 108, which may interface with the robotic system 100. The controller 108 may serve as a link between portions of the robotic system 100, such as a link between mechanical components 110 and/or electrical components 116. In some instances, the controller 108 may serve as an interface between the robotic system 100 and another computing device. Further, the controller 108 may serve as an interface between the robotic system 100 and a user(s). The controller 108 may include various components for communicating with the robotic system 100, including a joystick(s), buttons, among others. The example interfaces and communications noted above may be implemented via a wired or wireless connection, or both. The controller 108 may perform other functions for the robotic system 100 as well. Other examples of controllers may exist.

Mechanical components 110 represent possible hardware of the robotic system 100 that may enable the robotic system 100 to operate and perform physical operations. As a few examples, the robotic system 100 may include actuator(s), extendable leg(s) ("legs"), arm(s), wheel(s), one or more structured bodies for housing the computing system or other components, and other mechanical components. The mechanical components 110 may depend on the design of the robotic system 100 and may also be based on the functions and/or tasks the robotic system 100 may be configured to perform. As such, depending on the operation and functions of the robotic system 100, different mechanical components 110 may be available for the robotic system 100 to utilize. In some examples, the robotic system 100 may be configured to add and/or remove mechanical components 110, which may involve assistance from a user and/or other robot. For example, the robotic system 100 may be initially configured with four legs, but may be altered by a user or the robotic system 100 to remove two of the four legs to operate as a biped. Other examples of mechanical components 110 may be included within some implementations.

Additionally, the robotic system 100 may include one or more sensor(s) 112 arranged to sense aspects of the robotic system 100. The sensor(s) 112 may include one or more force sensors arranged to measure load on various components of the robotic system 100. In an example, the sensor(s) 112 may include one or more force sensors on each leg. Such force sensors on the legs may measure the load on the actuators that move one or more members of the legs.

The sensor(s) 112 may further include one or more position sensors. Position sensors may sense the position of the actuators of the robotic system. In one implementation, position sensors may sense the extension, retraction, or rotation of the actuators on the legs of the robot. The sensor(s) 112 may further include one or more velocity and/or acceleration sensors. For instance, the sensor(s) 112 may include an inertial measurement unit (IMU). The IMU may sense velocity and acceleration in the world frame, with respect to the gravity vector. The velocity and acceleration of the IMU may then be translated to the robotic system, based on the location of the IMU in the robotic system and the kinematics of the robotic system. Other sensor(s) 112 are also possible, including proximity sensors, motion sensors, load sensors, touch sensors, depth sensors, ultrasonic range sensors, and infrared sensors, among other possibilities.

The sensor(s) 112 may provide sensor data to the processor(s) 102 to allow for appropriate interaction of the robotic system 100 with the environment as well as monitoring of operation of the systems of the robotic system 100. The sensor data may be used in evaluation of various factors for activation and deactivation of mechanical components 110 and electrical components 116 by controller 108 and/or a computing system of the robotic system 100.

The sensor(s) 112 may provide information indicative of the environment of the robot for the controller 108 and/or computing system to use to determine operations for the robotic system 100. For example, the sensor(s) 112 may capture data corresponding to the terrain of the environment or location of nearby objects, which may assist with environment recognition and navigation, etc. In an example configuration, the robotic system 100 may include a sensor system that includes RADAR, LIDAR, SONAR, VICON®, one or more cameras, a global positioning system (GPS) transceiver, and/or other sensors for capturing information of the environment of the robotic system 100. The sensor(s) 112 may monitor the environment in real-time and detect obstacles, elements of the terrain, weather conditions, temperature, and/or other parameters of the environment for the robotic system 100.

Further, the robotic system 100 may include other sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The sensor data provided by the sensors may enable the computing system of the robotic system 100 to determine errors in operation as well as monitor overall functioning of components of the robotic system 100. For example, the computing system may use sensor data to determine a stability of the robotic system 100 during operations as well as measurements related to power levels, communication activities, components that require repair, among other information. As an example configuration, the robotic system 100 may include gyroscope(s), accelerometer(s), and/or other possible sensors to provide sensor data relating to the state of operation of the robot. Further, sensor(s) 112 may also monitor the current state of a function, such as a gait, that the robotic system 100 may currently be operating. Other example uses for the sensor(s) 112 may exist as well.

Additionally, the robotic system 100 may also include one or more power source(s) 114 configured to supply power to various components of the robotic system 100. Among possible power systems, the robotic system 100 may include a hydraulic system, electrical system, batteries, and/or other types of power systems. As an example illustration, the robotic system 100 may include one or more batteries configured to provide charge to components that may receive charge via a wired and/or wireless connection. Within examples, components of the mechanical components 110 and electrical components 116 may each connect to a different power source or may be powered by the same power source. Components of the robotic system 100 may connect to multiple power sources 114 as well.

Within example configurations, any type of power source may be used to power the robotic system 100, such as a gasoline engine. Further, the power source(s) 114 may charge using various types of charging, such as wired connections to an outside power source, wireless charging, combustion, or other examples. Additionally, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system of the robotic system 100 may transfer a large amount of power through small tubes, flexible hoses, or other links between components of the robotic system 100. Other power sources may be included within the robotic system 100 within examples.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various functions. The electrical components 116 may be configured to provide power from the power source(s) 114 to the various mechanical components 110, for example. Further, the robotic system 100 may include electric motors. Other examples of electrical components 116 may exist as well.

Figure 2:
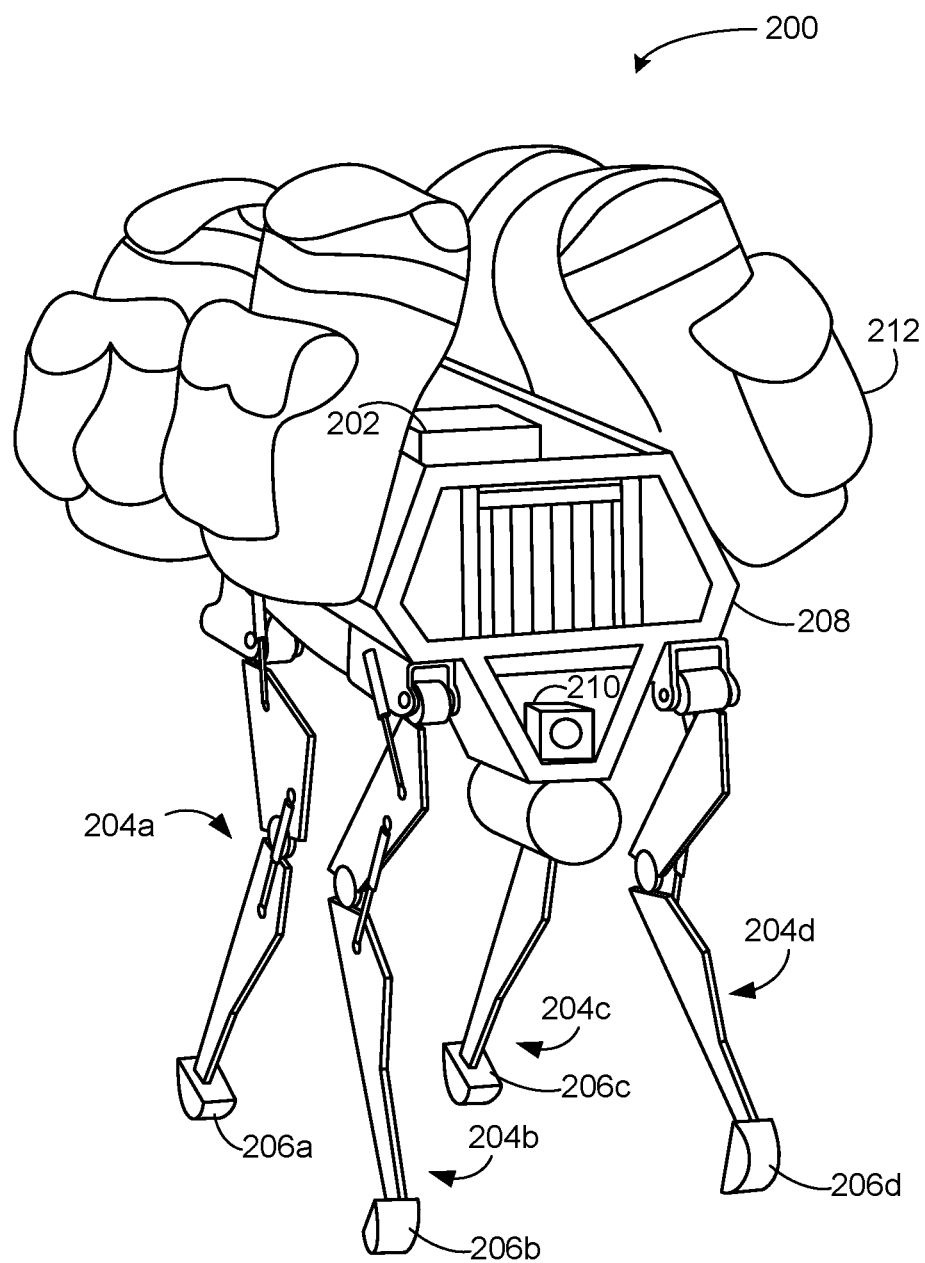
FIG. 2 illustrates a quadruped robot, according to an example implementation.

FIG. 2 illustrates an example quadruped robot 200, according to an example implementation. Among other possible functions, the robot 200 may be configured to perform some of the methods described herein during operation. The robot 200 includes a control system 202, and legs 204a, 204b, 204c, 204d connected to a body 208. Each leg may include a respective foot 206a, 206b, 206c, 206d that may contact the ground surface. The robot 200 may also include sensors (e.g., sensor 210) configured to provide sensor data to the control system 202 of the robot 200. Further, the robot 200 is illustrated carrying a load 212 on the body 208. Within other example implementations, the robot 200 may include more or less components and may additionally include components not shown in FIG. 2.

The robot 200 may be a physical representation of the robotic system 100 shown in FIG. 1 or may be based on other configurations. To operate, the robot 200 includes a computing system that may be made up of one or more computing devices configured to assist in various operations of the robot 200, which may include processing data and providing outputs based on the data. The computing system may process information provided by various systems of the robot 200 (e.g., a sensor system) or from other sources (e.g., a user, another robot, a server) and may provide instructions to the systems to operate in response.

Additionally, the computing system may monitor systems of the robot 200 during operation, to determine errors and/or monitor regular operation, for example. In some example configurations, the computing system may serve as a connection between the various systems of the robot 200 that coordinates the operations of the systems together to enable the robot 200 to perform functions. Further, although the operations described herein correspond to a computing system of a robot performing tasks, the computing system may be made of multiple devices, processors, controllers, and/or other entities configured to assist in the operation of the robot. Additionally, the computing system may operate using various types of memory and/or other components.

Although the robot 200 includes four legs 204a-204d in the illustration shown in FIG. 2, the robot 200 may include more or less legs within other examples. Further, the configuration, position, and/or structure of the legs 204a-204d may vary in example implementations. The legs 204a-204d enable the robot 200 to move and may be configured to operate in multiple degrees of freedom to enable different techniques of travel to be performed. In particular, the legs 204a-204d may enable the robot 200 to travel at various speeds through mechanically controlling the legs 204a-204d according to the mechanics set forth within different gaits. A gait is a pattern of movement of the limbs of an animal, robot, or other mechanical structure. As such, the robot 200 may navigate by operating the legs 204a-204d to perform various gaits. The robot 200 may use one or more gaits to travel within an environment, which may involve selecting a gait based on speed, terrain, the need to maneuver, and/or energy efficiency.

Further, different types of robots may use different gaits due to differences in design that may prevent use of certain gaits. Although some gaits may have specific names (e.g., walk, trot, run, bound, gallop, etc.), the distinctions between gaits may overlap. The gaits may be classified based on footfall patterns—the locations on the ground surface for the placement the feet 206a-206d. Similarly, gaits may also be classified based on mechanics.

One or more systems of the robot 200, such as the control system 118, may be configured to operate the legs 204a-204d to cause the robotic 200 to move. Additionally, the robot 200 may include other mechanical components, which may be attached to the robot 200 at various positions. The robot 200 may include mechanical arms, grippers, or other features. In some examples, the legs 204a-204d may have other types of mechanical features that enable control upon various types of surfaces that the robot may encounter, such as wheels, etc. Other possibilities also exist.

As part of the design of the example robot 200, the body 208 of the robot 200 connects to the legs 204a-204d and may house various components of the robot 200. As such, the structure of the body 208 may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body 208 as well as the legs 204 may be developed using various types of materials, such as various metals or plastics. Within other examples, a robot may have a body with a different structure or made of other types of materials.

The sensor(s) 210 of the robot 200 may include various types of sensors, such as the camera or sensing system shown in FIG. 2. The sensor(s) 210 is positioned on the front of the body 208, but may be placed at other positions of the robot as well. As described for the robotic system 100, the robot 200 may include a sensory system that includes force sensors, position sensors, IMUs, RADAR, LIDAR, SONAR, VICON®, GPS, accelerometer(s), gyroscope(s), and/or other types of sensors. The sensor(s) 210 may be configured to measure parameters of the environment of the robot 200 as well as monitor internal operations of systems of the robot 200. As an example illustration, the robot 200 may include sensors that monitor the accuracy of its systems to enable the computing system to detect a system within the robot 100 that may be operating incorrectly. Other uses of the sensor(s) 210 may be included within examples.

The load 212 carried by the robot 200 may represent various types of cargo that the robot 200 may transport. The load 212 may also represent external batteries or other types of power sources (e.g., solar panels) that the robot 200 may utilize. The load 212 represents one example use for which the robot 200 may be configured. The robot 200 may be configured to perform other operations as well.

Additionally, as shown with the robotic system 100, the robot 200 may also include various electrical components that may enable operation and communication between the mechanical features of the robot 200. Also, the robot 200 may include one or more computing systems that include one or more processors configured to perform various operations, including processing inputs to provide control over the operation of the robot 200. The computing system may include additional components, such as various types of storage and a power source, etc.

During operation, the computing system may communicate with other systems of the robot 200 via wired or wireless connections and may further be configured to communicate with one or more users of the robot. As one possible illustration, the computing system may receive an input from a user indicating that the user wants the robot to perform a particular gait in a given direction. The computing system may process the input and may perform an operation that may cause the systems of the robot to perform the requested gait. Additionally, the robot's electrical components may include interfaces, wires, busses, and/or other communication links configured to enable systems of the robot to communicate.

Furthermore, the robot 200 may communicate with one or more users and/or other robots via various types of interfaces. In an example implementation, the robot 200 may receive input from a user via a joystick or similar type of interface. The computing system may be configured to measure the amount of force and other possible information from inputs received from a joystick interface. Similarly, the robot 200 may receive inputs and communicate with a user via other types of interfaces, such as a mobile device or a microphone. The computing system of the robot 200 may be configured to process various types of inputs.

Figure 3:
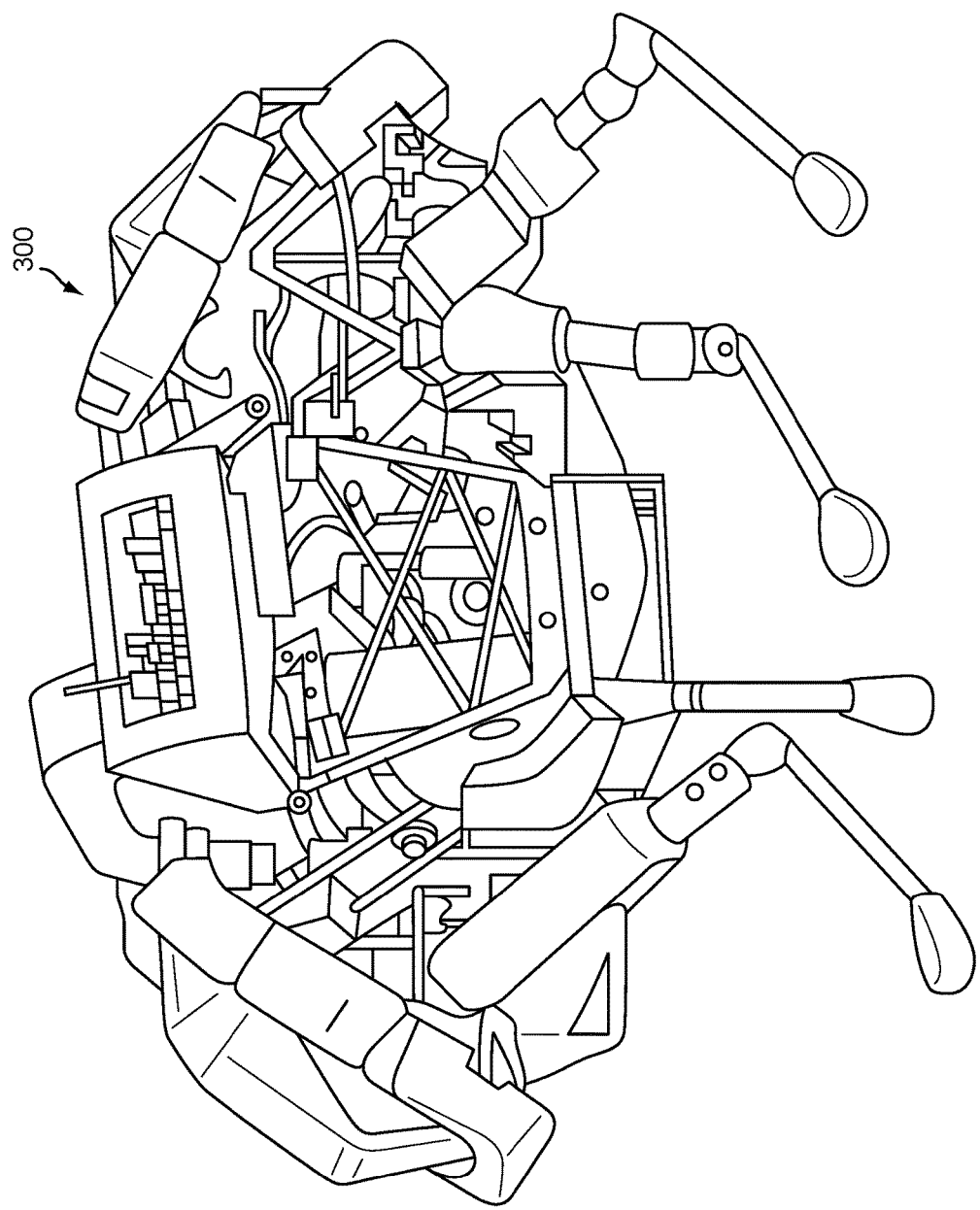
FIG. 3 illustrates another quadruped robot, according to an example implementation.

FIG. 3 illustrates another quadruped robot 300 according to an example implementation. Similar to robot 200 shown in FIG. 2, the robot 300 may correspond to the robotic system 100 shown in FIG. 1. The robot 300 serves as another possible example of a robot that may be configured to perform some of the implementations described herein.

Figure 4:
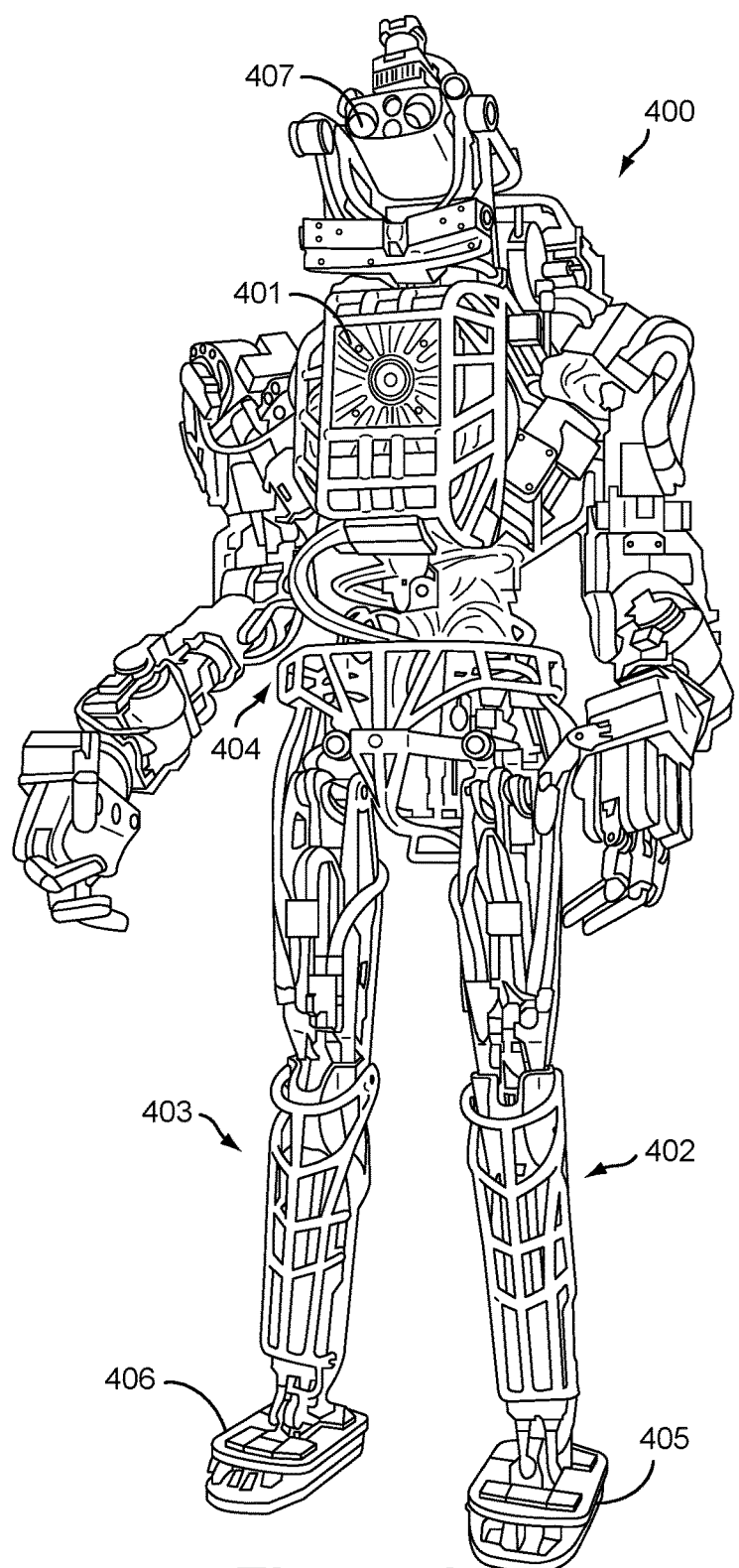
FIG. 4 illustrates a biped robot, according to an example implementation.

FIG. 4 illustrates a biped robot 400 according to another example implementation. Similar to robots 200 and 300 shown in FIGS. 2 and 3, the robot 400 may correspond to the robotic system 100 shown in FIG. 1, and may be configured to perform some of the implementations described herein. The robot 400 may include more or less components than those shown in FIG. 2 and discussed with respect to the robot 200. For example, the robot 400 may include a control system 401 and legs 402, 403 connected to a body 404. Each leg may include a respective foot 405, 406, that may contact the ground surface. The robot 400 may also include sensors (e.g., sensor 407) configured to provide sensor data to the control system 401 of the robot 400.

III. EXAMPLE IMPLEMENTATIONS FOR AVOIDING LEG COLLISIONS

Example implementations are discussed below for determining and avoiding potential leg collisions in an example robot based on a two-dimensional projection of the robot's feet. Flow charts 500 and 900, shown in FIGS. 5 and 9 respectively, present example operations that may be implemented by a biped robot, such as the example robot 400 shown in FIG. 4. Flow charts 500 and 900 may include one or more operations or actions as illustrated by one or more of the blocks shown in each figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, the flow charts 500 and 900 and other operations disclosed herein provide the operation of possible implementations. In this regard, each block may represent a module, a segment, or a portion of program code, which includes one or more instructions executable by a processor for implementing specific logical operations. The program code may be stored on any type of computer readable medium, for example, such as a storage device including a disk or hard drive. In addition, each block may represent circuitry that is wired to perform the specific logical operations.

Further, the term ground surface as used herein is meant to encompass any possible surface or terrain that the robot may encounter, and is not meant to be limiting. For instance, the ground surface may be indoors or outdoors, may be rigid or loose, such as sand or gravel, and may include discontinuities or irregularities such as stairs, rocks, fallen trees, debris, and the like. Numerous other examples exist.

A. First Example Implementation for Avoiding Leg Collisions

Figure 5:
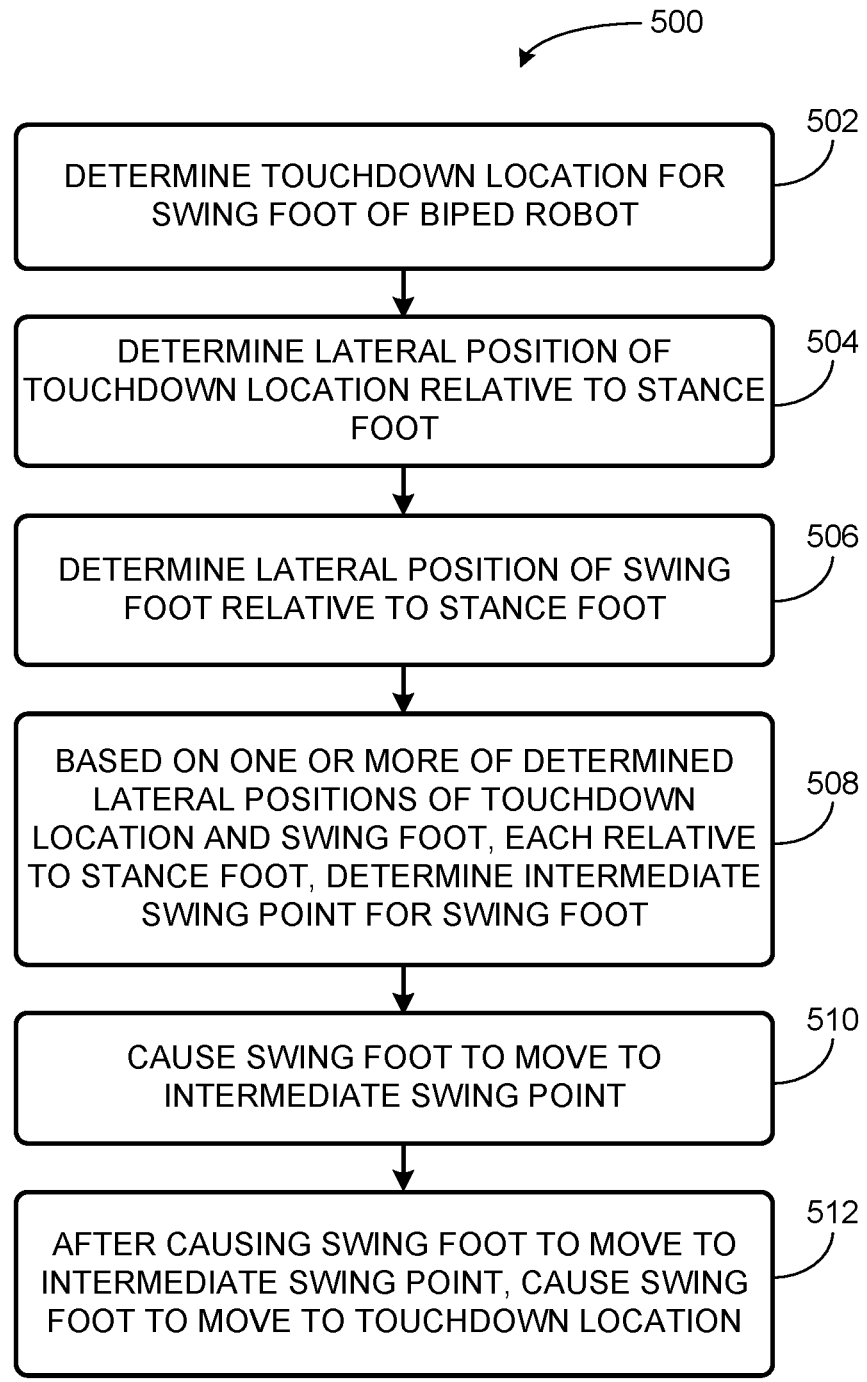
FIG. 5 is a flowchart according to an example implementation.

FIG. 5 is a flowchart 500 illustrating operations for determining and avoiding potential leg collisions in an example biped robot by focusing on foot collisions in two dimensions. The following paragraphs discuss a biped robot with two feet, however the operations may also be applicable to robots with a different number of feet, such as a quadruped robot with four feet, among other examples. Further, the operations discussed below may be performed by a robot that is walking, trotting, or running. Other gaits are also possible.

At block 502, a biped robot may determine a touchdown location for a swing foot that is coupled to a body of the biped robot. The biped robot may be, for example, the biped robot 400 shown in FIG. 4. The biped robot 400 may also include a stance foot, and both the swing foot and stance foot may be coupled to a body of the robot 400. The stance foot may be in contact with the ground surface, while the swing foot might not be in contact the ground surface.

The touchdown location for the swing foot represents a target location for the swing foot to contact the ground surface at the end of its swing trajectory. Further, the touchdown location may be determined by the robot 400 at a given frequency throughout a step, such as a frequency in the range of 1-10,000 Hz. For example, the robot may determine the touchdown location for the swing foot every five milliseconds.

The touchdown location for a given step may be determined by the robot 400 based on a number of factors, such as the heading of the robot, and the current needs of the robot to maintain its balance or correct any gait errors that may have occurred. Gait errors may include a slip of the robot's foot or a collision with an obstacle, among other examples. However, in some cases the determined touchdown location may result in a swing trajectory for the swing foot that may collide with the stance leg.

To determine whether such a collision may occur, at block 504, the robot 400 may determine a lateral position of the touchdown location relative to the stance foot. Similarly, at block 506, the robot 400 may determine a lateral position of the swing foot relative to the stance foot. In some cases, one or both of these may indicate that a potential collision is possible. The lateral positions of the robot's feet may be determined based on data received from sensors of the robot 400, such as position and movement sensors in the robot's legs 402, 403, which may provide data regarding the angles of the robot's leg joints.

FIG. 6A illustrates a top view of the foot positions of the robot 400 walking from left to right in the forward (x-axis) direction. Here, the stance foot is the left foot 405, and the swing foot is the right foot 406, although other arrangements are possible. FIG. 6A also shows the determined touchdown location 601. In some examples, the robot 400 may approximate the touchdown location 601 and the feet 405, 406 as single points, without length or width. In other examples, the stance foot 405 of the robot 400 may have a footprint, shown as the solid rectangle in FIG. 6A, that is based on the structural size and shape of the foot. Thus, the determination of the forward (x-axis) and lateral (y-axis) positions of the feet 405, 406 and the touchdown location 601 may additionally or alternatively be based on this representation of the footprint.

In some implementations, the robot 400 may expand the single point or footprint representation for the stance foot 405 in order to introduce a factor of safety in avoiding leg collisions. For example, the robot 400 may determine a lateral side 602a, a medial side 602b, a posterior side 602c, and an anterior side 602d of the stance foot 405 that is each outwardly offset from the footprint such that they define an expanded footprint 602, shown as the dashed rectangle in FIG. 6A. The robot 400 may then base the determinations of the relative lateral positions of the feet and the touchdown location 601 on the expanded footprint 602. A similar expanded footprint may additionally or alternatively be determined for swing foot 406.

The distance that the expanded footprint 602 is offset from the structural footprint may be based on a number of factors, such as the robot's configuration, gait, and velocity, among other possibilities. In some examples, the expanded footprint 602 may be offset from the structural footprint of the stance foot 405 within the range of 2-10 centimeters. Although the expanded footprint 602 is shown in FIG. 6A as a similar rectangle to the stance foot 405, the robot 400 may determine the expanded footprint 602 disproportionately on different sides of the stance foot 405 in some cases. The determination of an expanded footprint may also be used in an implementation involving a quadruped robot, and may be relatively larger, where the structural footprint of the foot may be relatively smaller than that of a biped robot. Other examples are also possible.

In the example shown in FIG. 6A, the robot 400 may determine that the touchdown location 601 is laterally outside of the medial side 602b of the stance foot 405. Because of the lateral position of the touchdown location 601, a line 603 representing a potential swing trajectory from the swing foot 406 to the touchdown location 601 indicates a potential collision.

At block 508, the robot 400 may, based on one or more of the determined lateral positions of the touchdown location 601 and the swing foot 406, each relative to the stance foot 405, determine an intermediate swing point 604 for the swing foot 406. The intermediate swing point represents a two-dimensional point through which the swing foot 406 may move without colliding with the stance foot 405. For example, as shown in FIG. 6B, the intermediate swing point 604 is not on the line 603 defined by the swing foot 406 and the touchdown location 601, so as to avoid the potential collision.

In FIGS. 6A-6B, the determination of the intermediate swing point 604 is based on the lateral position of the touchdown location 601 relative to the stance foot 405. In this case, the robot 400 may determine the intermediate swing point 604 to be medial to the medial side 602a of the stance foot 405 and anterior to the anterior side 602d of the stance foot 405. For instance, the intermediate swing point 604 may be determined based on the expanded footprint 602, and placed at the medial-anterior corner of the expanded footprint 602 as shown in FIG. 6B. However, other locations for the intermediate swing point 604 are also possible.

At block 510 the robot may cause the swing foot 406 to move to the intermediate swing point 604. For instance, the robot 400 may cause the actuators in the hip, knee, and/or ankle joints to move the robot's leg such that the trajectory of the swing foot 406 follows a line 605 from its current position to the intermediate swing point 604. In some examples, the robot 400 may cause a medial edge 406a of the swing foot 406 to move to the intermediate swing point 604. Alternatively, the robot may determine an expanded footprint, as discussed above, for the swing foot 406, and may cause a medial side of the expanded footprint to move to the intermediate swing point 604. In yet another example, the robot 400 may determine the size of the stance foot's expanded footprint 602 based on the width of the swing foot 406, and may cause the center of the swing foot 406 to move to the intermediate swing point 604. Other possibilities exist.

As noted above, the determination of potential leg collisions and the avoidance of the collisions are accomplished by the robot 400 in two dimensions, by focusing on the forward and lateral positions of the touchdown location and robot's feet 405, 406. Accordingly, the intermediate swing point 604 is a two-dimensional point, without a vertical (z-axis) component. Therefore, while the robot 400 may alter the forward and/or lateral trajectory of the swing foot 406 to cause the swing foot 406 to move to the intermediate swing point 604, the vertical component of the swing foot's trajectory 406 (i.e., it's height off the ground surface) might not need to be adjusted.

At block 512, after causing the causing the swing foot 406 to move to the intermediate swing point 604, the robot 400 may cause the swing foot 406 to move to the touchdown location 601. For example, the robot 400 may cause the trajectory of the swing foot 406 to follow a line 606 from the intermediate swing point 604 to the touchdown location 601. Thus, the robot 400 may place the swing foot 406 in the originally determined touchdown location, while also avoiding the potential collision of its legs.

In some implementations, the robot 400 may repeat the operations of determining the lateral positions of the touchdown location 601 and the swing foot 406, each relative to the stance foot 405, at a frequency until the robot 404 detects an indication to stop repeating the operations. The frequency may be within the range of 1-10,000 Hz. Other frequencies are also possible depending on the size, configuration, and gait of the robot, among other considerations. For example, the robot 400 may determine the relative lateral positions of its feet and the touchdown location every three milliseconds. This may allow the robot 400 to respond to disturbances that may occur during a step, while the swing foot 406 is following a determined swing trajectory. Based on the updated relative lateral positions of the feet and touchdown location, the robot 404 may also update the intermediate swing point 604 as necessary.

To further reduce the computational demand on its processor(s), the robot 400 may detect an indication to stop determining the lateral positions of the touchdown location 601 and the swing foot 406, each relative to the stance foot 405. For example, for a given step of the robot 400, once the swing foot 406 passes the stance foot 405 in the forward direction, a collision of the robot's legs might no longer be likely to occur. Thus, the determination of the relative lateral positions might be temporarily discontinued.

To detect this situation, the robot 400 may determine a forward position of the swing foot 406 relative to the stance foot 405 at a given frequency. The indication to stop repeating the determination of relative lateral positions may include an indication that the forward position of the swing foot 406 is anterior to the anterior side 602d of the stance foot 405. After the swing foot 406 reaches the touchdown location 601, it may become the stance foot for the next step of the robot 400, as the stance foot 405 lifts up from the ground surface to become the swing foot. The robot 400 may then resume determining the relative lateral positions of its feet and the next touchdown location.

In the example shown in FIGS. 6A-6B, the potential leg collision may be determined based on the lateral position of the touchdown location 601 relative to the stance foot 405. In some cases, a potential leg collision may alternatively be determined based on the lateral position of the swing foot 406 relative to the stance foot 405. FIG. 7A illustrates another top view of the foot positions of the robot 400 and a touchdown location 701, here in a different configuration. In this example, the robot 400 may determine that the swing foot 406 is laterally outside of the medial side 602b of the stance foot 405. Because of the lateral position of the swing foot 406, a line 702 representing a potential swing trajectory from the swing foot 406 to the touchdown location 701 indicates a potential collision.

Based on the determined lateral position the swing foot 406 relative to the stance foot 405, the robot 404 may determine an intermediate swing point 703 for the swing foot 406, as shown in FIG. 7B. As in FIG. 6B, the intermediate swing point 703 might not be on the line 702 defined by the swing foot 406 and the touchdown location 701, so as to avoid the potential collision. Rather, the robot 400 may determine an intermediate swing point 703 that is medial to the medial side 602a of the stance foot 405 and posterior to the posterior side 602c of the stance foot 405. In FIG. 7B, the intermediate swing point 703 is shown at the medial-posterior corner of the expanded footprint 602, however other locations are also possible.

The robot 400 may then cause the swing foot 406 to move to the intermediate swing point 703, for example, along the line 704. For instance, the robot 400 may cause the medial edge 406a of the swing foot 406 to move to the intermediate swing point 703, among other possibilities noted above. After causing the swing foot 406 to move to the intermediate swing point 703, the robot 400 may cause the swing foot 406 to move to the touchdown location 701. For example, the robot 400 may cause the trajectory of the swing foot 406 to follow a line 705 from the intermediate swing point 703 to the touchdown location 701.

FIG. 8A illustrates another example configuration of the feet and touchdown location 801 for the robot 400. Here, the robot 400 may determine that both the swing foot 406 and the touchdown location 801 are laterally outside of the medial side 602b of the stance foot 405, and thus a line 802 representing a potential swing trajectory from the swing foot 406 to the touchdown location 801 indicates a potential collision.

In this situation, the robot 400 may determine two intermediate swing points, as shown in FIG. 8B. For example, the robot 400 may determine a first intermediate swing point 803 that is medial to the medial side 602a of the stance foot 405 and posterior to the posterior side 602c of the stance foot 405. The robot 400 may also determine a second intermediate swing point 804 that is medial to the medial side 602a of the stance foot 405 and anterior to the anterior side 602c of the stance foot 405. As in the previous examples, the intermediate swing points 803, 804 are shown at the medial corners of the expanded footprint 602, however other locations are possible.

The robot 400 may then cause the swing foot 406 to move to the first intermediate swing point 803, for example, along the line 805. For instance, the robot 400 may cause the medial edge 406a of the swing foot 406 to move to the intermediate swing point 805, among other possibilities noted above. After causing the causing the swing foot 406 to move to the intermediate swing point 803, the robot 400 may cause the swing foot 406 to move to the second intermediate swing point 804. For example, the robot 400 may cause the trajectory of the swing foot 406 to follow a line 806 from the first intermediate swing point 803 to the second intermediate swing point 804. The robot 400 may then cause the swing foot 406 to move to the touchdown location 801, for example, along the line 807.

B. Second Example Implementation for Avoiding Leg Collisions

Figure 9:
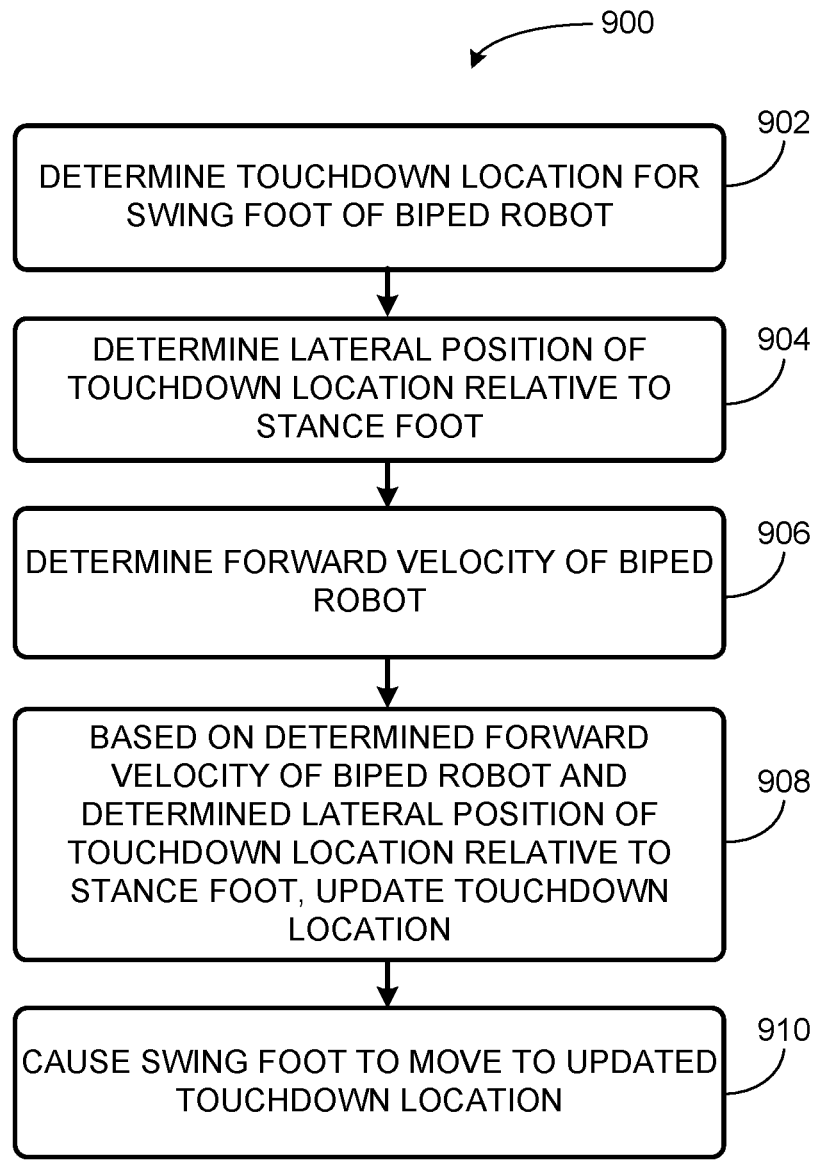
FIG. 9 is a flowchart according to an example implementation.

FIG. 9 is another flowchart 900 illustrating operations for determining and avoiding potential leg collisions in an example biped robot by focusing on foot collisions in two dimensions. The following paragraphs discuss a biped robot with two feet, however the operations may also be applicable to robots with a different number of feet, such as a quadruped robot with four feet, among other examples. Further, the operations discussed below may be performed by a robot that is walking, trotting, or running. Other gaits are also possible.

At block 902, a biped robot may determine a touchdown location for a swing foot that is coupled to a body of the biped robot. The biped robot may be, for example, the biped robot 400 shown in FIG. 4. The biped robot 400 may also include a stance foot, which may also be coupled to the body 404 of the robot 400. The stance foot may be in contact with the ground surface, while the swing foot might not be in contact the ground surface.

The touchdown location may correspond to a target location where the swing foot may contact the ground surface at the end of its swing trajectory. The touchdown location for a given step may be determined by the robot 400 based on a number of factors, such as the heading of the robot, and the current needs of the robot to maintain its balance or correct any gait errors that may have occurred. Gait errors may include a slip of the robot's foot or a collision with an obstacle, among other examples. However, in some cases the determined touchdown location may result in a swing trajectory for the swing foot that may collide with the stance leg.

Figure 10A:
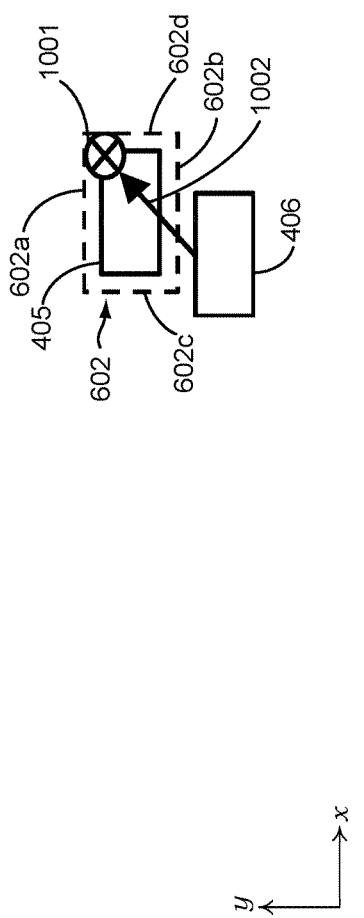
FIG. 10A illustrates a swing foot and a stance foot of a robot, according to an example implementation.

Thus, at block 904, the robot 400 may determine a lateral position of the touchdown location relative to the stance foot. The lateral positions of the robot's feet may be determined based on data received from sensors of the robot 400, such as position and movement sensors in the robot's legs 402, 403, which may provide data regarding the angles of the robot's leg joints. As discussed above with respect to flowchart 700, the lateral position of the touchdown location relative to the stance foot may indicate a potential leg collision. FIG. 10A illustrates a top view of the foot positions of the robot 400 walking from left to right in the forward (x-axis) direction. Here, the stance foot is the left foot 405, and the swing foot is the right foot 406, although other arrangements are possible. FIG. 10A also shows the determined touchdown location 1001.

The stance foot 405 of the robot 400 may have a structural footprint, shown as the solid rectangle in FIG. 10A, that is based on the size and shape of the foot. Thus, the determination of the lateral (y-axis) positions of the feet and the touchdown location may be based on this footprint. However, as described above, the robot 400 may also determine a lateral side 602a, a medial side 602b, a posterior side 602c, and an anterior side 602d of the stance foot 405 that collectively define an expanded footprint 602, shown as the dashed rectangle in FIG. 10A.

In the example shown in FIG. 10A, the robot 400 may determine that the touchdown location 1001 is laterally outside of the medial side 602b of the stance foot 405. Because of the lateral position of the touchdown location 1001, a line 1002 representing a potential swing trajectory from the swing foot 406 to the touchdown location 1001 indicates a potential collision.

In some implementations, the robot 400 may be taking relatively small steps, which may correspond to moving at forward velocity that is relatively low. In these situations, the touchdown location 1001 for the swing foot 406 of the robot 400 might not be forward of the stance foot 405, as shown in FIG. 10A. Rather, the touchdown location 1001 may partially or wholly overlap with the stance foot 405. Consequently, the determination of only the relative lateral positions of the robot's feet and the touchdown location might not identify the full extent of the potential leg collision. Further, unlike the examples shown in FIGS. 6A-8B, the robot 400 might not have the ability to place the swing foot 406 at the touchdown location 1001, regardless of any intermediate swing points that may be determined.

Therefore, to detect these potential situations, the robot 400 may, at block 906, determine a forward velocity of the robot 400. The forward velocity may be determined based on data received from sensors of the robot 400, such as movement and positions sensors in the robot's legs 402, 403, or an inertial measurement unit within the robot's body 404. Other examples are also possible. The robot 400 may determine that the forward velocity of the robot 400 is less than a non-zero threshold velocity. The threshold velocity may be within the range of 0.1 to 0.8 meters per second. For example, the non-zero threshold velocity may be 0.5 meters per second. Other thresholds are possible, and may vary depending on the configuration, size, and gait of the robot.

At block 908, the robot 400 may, based on the determined forward velocity of the robot 400 and the determined lateral position of the touchdown location 1001 relative to the stance foot 405, update the touchdown location 1001. For example, the robot 400 may determine that the forward velocity of the robot 400 is less than the non-zero threshold velocity, which may indicate relatively small steps, and that the touchdown location 1001 is laterally outside of the stance foot 405. These two determinations, in conjunction, may indicate that the touchdown location 1001 is overlapping with the stance foot 405. Thus, the robot 400 may update the touchdown location 1001 by moving it such that the swing foot 406 moves along a swing trajectory that does not collide with the stance foot 405.

Figure 10B:
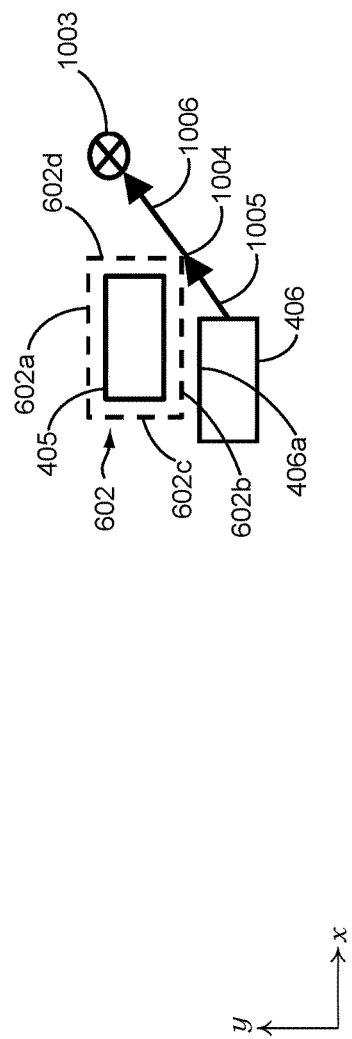
FIG. 10B illustrates the swing foot and the stance foot of the robot, according to the example implementation shown in FIG. 10A.

For example, the robot 400 may move the touchdown location 1001 anterior to the anterior side 602d of the stance foot 405, as shown in FIG. 10B. This may cause the swing foot 406 to move through the intermediate swing point 1004, which may be at the medial-anterior corner of the expanded footprint 602, although other locations are also possible.

In some implementations, the robot 400 may need to take a backward step. For example, if the robot 400 has a relatively low or perhaps a zero forward velocity, a disturbance may cause the robot 400 to begin to fall backwards. In this case, the same logic as above may apply in the lateral direction, but may be reversed in the forward direction. Thus, the robot 400 may update the touchdown location 1001 by moving it posterior to the posterior side of the stance foot 405.

At block 910, the robot 400 may cause the swing foot 406 to move to the updated touchdown location 1003. In some cases, where the robot 400 has determined the intermediate swing point 1004, the robot may cause the swing foot 406 to move the intermediate swing point 1004, on line 1005 for example, before causing the swing foot 406 to move to the updated touchdown location 1003. For instance, the robot 400 may cause the medial edge 406a of the swing foot 406 to move to the intermediate swing point 1004, among other possibilities noted above. The robot 400 may then cause the swing foot 406 to move to the updated touchdown location 1003 along line 1006, which may be collinear with line 1005.

As discussed above with respect to flowchart 500, the robot 400 may repeat the operations described with respect to flowchart 900 at a given frequency. Similarly, the robot 400 may determine the forward position of the swing foot with respect to the stance foot 405, and may stop repeating the operations upon detecting an indication that the swing foot 405 is anterior to the anterior side 602*d* of the stance foot.

IV. CONCLUSION

While various implementations and aspects have been disclosed herein, other aspects and implementations will be apparent to those skilled in the art. The various implementations and aspects disclosed herein are for purposes of illustration and are not intended to be limiting, with the true scope and spirit being indicated by the following claims.

I claim:

1. A method comprising:
    determining a touchdown location for a swing foot of a biped robot, the biped robot having a stance foot, wherein the swing foot and the stance foot are each coupled to a body of the biped robot;
    determining a lateral position of the touchdown location relative to the stance foot by determining that the touchdown location is laterally outside of a medial side of the stance foot;
    determining a forward velocity of the biped robot;
    based on the determined forward velocity of the biped robot and the determined lateral position of the touchdown location relative to the stance foot indicating a collision between the swing foot and stance foot, updating the touchdown location, wherein updating the touchdown location is further based on the determination that the lateral position of the touchdown location is laterally outside of the medial side of the stance foot; and
    causing, by the biped robot, the swing foot to move to the updated touchdown location.

2. The method of claim 1, wherein determining the forward velocity of the biped robot comprises determining that the forward velocity of the biped robot is less than a non-zero threshold velocity, wherein updating the touchdown location is based on the determination that the forward velocity of the biped robot is less than the non-zero threshold velocity.

3. The method of claim 1, wherein updating the touchdown location comprises moving the touchdown location anterior to an anterior side of the stance foot.

4. The method of claim 1, wherein updating the touchdown location comprises moving the touchdown location posterior to a posterior side of the stance foot.

5. The method of claim 1, wherein the stance foot comprises a footprint, the method further comprising determining lateral, medial, posterior, and anterior sides of the stance foot to be outwardly offset from the footprint, the lateral, medial, posterior, and anterior sides of the foot defining an expanded footprint of the stance foot, wherein the updated the touchdown location is not within the expanded footprint of the stance foot.

6. The method of claim 5, wherein causing the swing foot to move to the updated touchdown location comprises causing the swing foot to move through one or more intermediate points before reaching the updated touchdown location, and wherein each of the one or more intermediate points is not within the expanded footprint of the stance foot.

7. The method of claim 1, wherein causing the swing foot to move to the updated touchdown location comprises causing, at the end of its swing trajectory, the swing foot to contact a ground surface at the updated touchdown location.

8. The method of claim 1, wherein determining the lateral position of the touchdown location relative to the stance foot comprises determining the lateral position by way of position or movement sensors associated with at least one of the swing foot and the stance foot.

9. The method of claim 1, wherein the touchdown location is updated at least twice during a step of the swing foot.

10. A biped robot comprising:
    a first foot;
    a second foot;
    a processor;
    a memory; and
    program instructions stored in the memory that, when executed by the processor, cause the biped robot to perform operations comprising:
        determining a touchdown location for the first foot;
        determining a lateral position of the touchdown location relative to the second foot by determining that the touchdown location is laterally outside of a medial side of the second foot;
        determining a forward velocity of the biped robot;
        based on the determined forward velocity of the biped robot and the determined lateral position of the touchdown location relative to the second foot indicating a collision between the first foot and second foot, updating the touchdown location, wherein updating the touchdown location is further based on the determination that the lateral position of the touchdown location is laterally outside of the medial side of the second foot; and
        causing the first foot to move to the updated touchdown location.

11. The biped robot of claim 10, wherein determining the forward velocity of the biped robot comprises determining that the forward velocity of the biped robot is less than a non-zero threshold velocity, wherein updating the touchdown location is based on the determination that the forward velocity of the biped robot is less than the non-zero threshold velocity.

12. The biped robot of claim 10, wherein updating the touchdown location comprises moving the touchdown location anterior to an anterior side of the second foot.

13. The biped robot of claim 10, wherein updating the touchdown location comprises moving the touchdown location posterior to a posterior side of the second foot.

14. The biped robot of claim 10, wherein the second foot comprises a footprint, the operations further comprising determining lateral, medial, posterior, and anterior sides of the second foot to be outwardly offset from the footprint, the lateral, medial, posterior, and anterior sides of the foot defining an expanded footprint of the second foot, wherein the updated the touchdown location is not within the expanded footprint of the second foot.

15. The biped robot of claim 14, wherein causing the first foot to move to the updated touchdown location comprises causing the first foot to move through one or more intermediate points before reaching the updated touchdown location, and wherein each of the one or more intermediate points is not within the expanded footprint of the second foot.

16. The biped robot of claim 10, wherein causing the first foot to move to the updated touchdown location comprises causing, at the end of its first trajectory, the first foot to contact a ground surface at the updated touchdown location.

17. The biped robot of claim 10, wherein determining the lateral position of the touchdown location relative to the second foot comprises determining the lateral position by way of position or movement sensors associated with at least one of the first foot and the second foot.

18. An article of manufacture including a non-transitory computer-readable medium, having stored thereon program instructions that, upon execution by a computing device, cause the computing device to perform operations comprising:
- determining a touchdown location for a first foot of a biped robot, the biped robot having a second foot, wherein the first foot and second foot are each coupled to a body of the biped robot;
- determining a lateral position of the touchdown location relative to the second foot by determining that the touchdown location is laterally outside of a medial side of the second foot;
- determining a forward velocity of the biped robot;
- based on the determined forward velocity of the biped robot and the determined lateral position of the touchdown location relative to the second foot indicating a collision between the first foot and second foot, updating the touchdown location, wherein updating the touchdown location is further based on the determination that the lateral position of the touchdown location is laterally outside of the medial side of the second foot; and
- causing the first foot to move to the updated touchdown location.

* * * * *